B. P. GRAY.
HOOF PAD FOR HORSESHOES.
APPLICATION FILED JAN. 19, 1918.
1,320,000.
Patented Oct. 28, 1919.
2 SHEETS—SHEET 1.
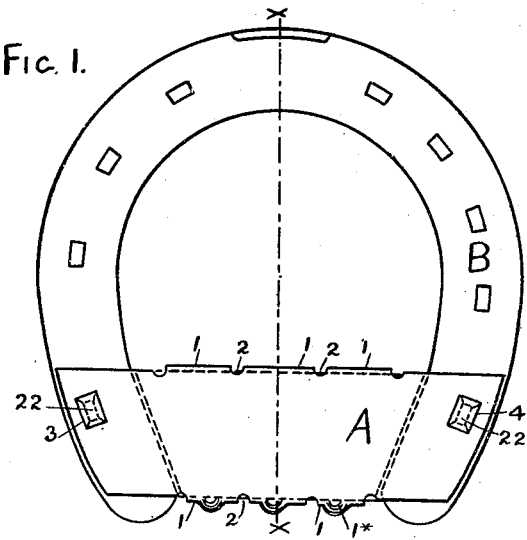
Fig. 1.
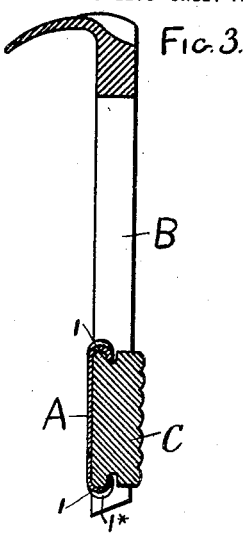
Fig. 3.
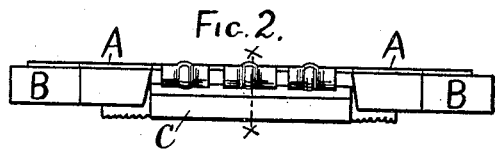
Fig. 2.
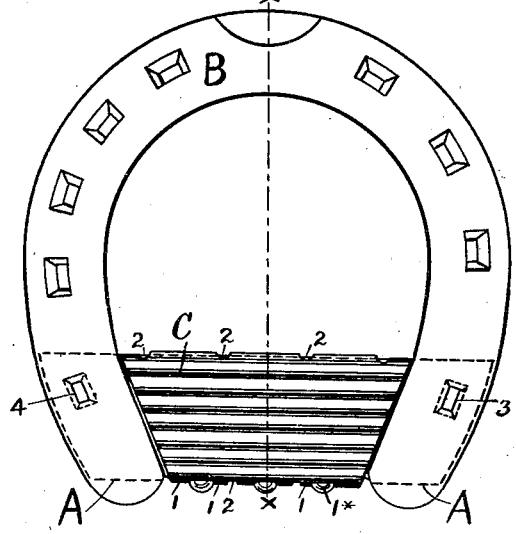
Fig. 4.
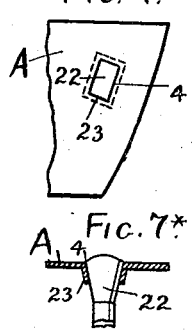
Fig. 7.
Fig. 7*
Fig. 5.
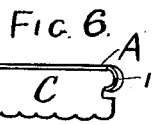
Fig. 6.
INVENTOR:
Bertram Parrott Gray
BY Wm Wallace White
ATT'Y.

B. P. GRAY.
HOOF PAD FOR HORSESHOES.
APPLICATION FILED JAN. 19, 1918.
1,320,000.
Patented Oct. 28, 1919.
2 SHEETS—SHEET 2.
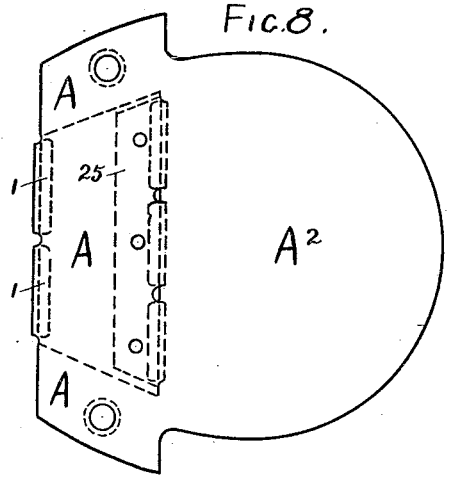
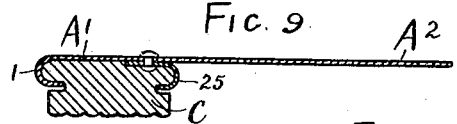
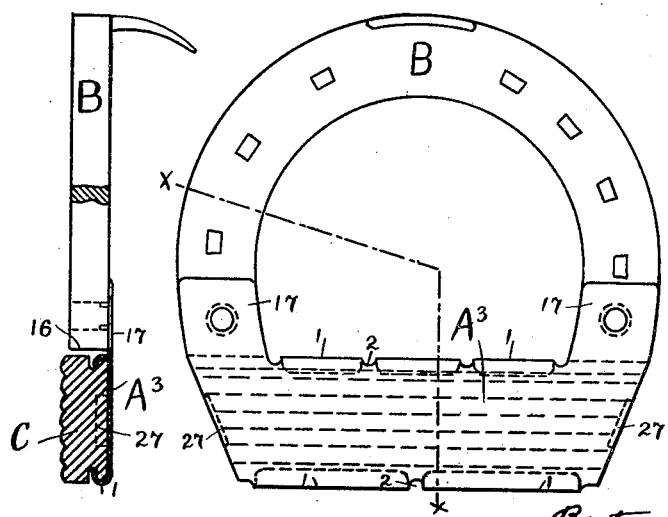
INVENTOR:
Bertram Parratt Gray
Wm Wallace White
ATT'Y.

UNITED STATES PATENT OFFICE.

BERTRAM PARROTT GRAY, OF SUTTON COLDFIELD, ENGLAND.

HOOF-PAD FOR HORSESHOES.

1,320,000. Specification of Letters Patent. Patented Oct. 28, 1919.

Application filed January 19, 1918. Serial No. 212,640.

*To all whom it may concern:*

Be it known that I, BERTRAM PARROTT GRAY, a subject of His Majesty the King of Great Britain and Ireland, residing at Ellangowan, Bishops Road, Sutton Coldfield, in the county of Warwick, England, have invented certain new and useful Improvements in and Connected with Hoof-Pads for Horseshoes, of which the following is a specification.

This invention has reference to hoof pads for horseshoes my object being to provide a pad which will be simple and cheap to manufacture, can readily be applied and renewed and which will bear properly against the frog so as to insure natural and lasting frog pressure from the horse, as it is well known that by bringing the frog into constant use the horse is not only saved from slipping but also from jar and concussion thereby materially lengthening his working life.

In hoof pads for horseshoes it has previously been proposed to provide a rubber or like pad adapted to fit between or against the heel ends of a horseshoe and to receive frog pressure and said pad being secured to the underside of an external attachment plate made with end portions which are about flush with the top of the pad and are adapted to fit and be fixed on to the flat top of the heel part of the shoe.

According to my invention I provide a resilient sheet-metal attachment plate to the underside of which a rubber or like pad part is fixed by parts on the plate which grip the pad thereto said pad being adapted to fit between or against the heel ends of the shoe and to receive frog pressure, and the attachment plate having its end portions projecting at the sides of the pad about flush with the top of the pad so as to fit and be fixed on to the flat top of the heel part of the shoe.

As the attachment plate is entirely outside the rubber or like pad part and does not have to pass through it, said pad part can when desired be quickly removed from the plate and a new pad part substituted therefor.

The attachment plate and rubber or like pad part can, as I will now describe by referring to the accompanying drawings, be constructed and arranged in various ways within the scope of my invention so that the pad will be properly gripped to the plate without the plate passing through any hole in the pad.

Figure 1 is a plan of a horseshoe and complete hoof pad constructed in accordance with this invention;

Fig. 2 is a back elevation of the same;

Fig. 3 is a longitudinal sectional elevation of the same taken on line $x$—$x$ of Figs. 1, 2 and 4;

Fig. 4 is an inverted plan of the same.

Fig. 5 is a back elevation of the pad detached from the shoe;

Fig. 6 is an end elevation of the pad;

Fig. 7 is a plan, and Fig. $7^x$ a sectional elevation, of a portion of the attachment plate separately;

Fig. 8 is a plan view of my improved hoof pad made with a plate to cover the interior of the shoe;

Fig. 9 is a longitudinal sectional view thereof;

Fig. 10 is a plan view illustrating my improved pad adapted for attachment to a short horseshoe; and Fig. 11 is a sectional view taken on the line $x$—$x$ of Fig. 10.

In the arrangement of my invention illustrated by Figs. 1 to 7 inclusive, the attachment plate A is made of sheet metal preferably sheet steel and is of a length equal to about the width of the shoe B so as to fit on to the top of the same at the heel part. The width of this plate A is about equal to that of the india rubber or other pad proper C underneath the plate and the sides of the plate are made with inturned flanges or like parts 1 strengthened or not strengthened by stamped ribs $1^x$. These inturned flanges 1 project downwardly and are turned inwardly toward one another so as between them to form a somewhat inverted dovetail or undercut recess in which the pad proper C fits and where the said pad C is secured by the inturned side flanges or the like 1 of the plate A. When the attachment plate A is separated from the shoe the pad proper C can readily be placed in position or removed by being pushed endwise into or out of the groove of the plate between the side flanges 1. The inturned flanges 1 are preferably not continuous but are made with one or more piercings or divisions such as 2 so that the flanges do not interfere with the slight springing or bending of the plate A as it bears against the frog. The end portions of the attachment plate lie upon the flat heel parts of the shoe B in which there are no recesses to receive the plate A and here the attachment plate is secured by any convenient means such for instance as by the end portions of the attachment plate being pierced with two holes 3, 4 which are plunged in the plate so that the metal of the plate projects around the holes 3, 4 at 23 (see Fig. 7) on the underside of the plate to engage in corresponding holes in the shoe B. These holes in the shoe B are preferably the same size and shape as the holes for the nails which fix the shoe to the hoof and can be made by the same punch but with the larger end in the top face of the shoe and the plate A can for additional security have the headed ends of two horse nails 22 inserted from the upper side into the holes in the plate and shoe so that the plate will then be properly secured to the shoe when the latter is fixed on the hoof as the hoof will prevent the nail head from rising out of the holes in the plate and shoe. Or instead of a nail head, flat headed or other rivets may be employed and the holes with which they engage may be the usual holes which are formed in the heel parts of a shoe to receive the frost cogs thus avoiding the necessity of making any special holes for securing the attachment plate. Or other convenient means may be employed for securing the attachment plate to the shoe such for instance as by the attachment plate being made with short downwardly bent tongues which engage with holes in the shoe.

The pad proper C can be made of the usual india-rubber composition employed for hoof pads or made of other suitable substance such for instance as a mixture of rope and india rubber molded together or of any other india rubber or other composition which is suitable for making hoof pads.

If desired the portion of the space within the shoe which is not covered by the attachment plate can be covered by a portion $A^2$ of that plate (see Fig. 8) which is made of the proper size and shape to fit on to the top of the shoe within the nail holes. In this case the pad proper C is fixed to the combined plate A, $A^2$ by the aforesaid flanges 1 formed with the plate A and at the other side by similar flanges which form part of a metal strip 25 which is riveted to the underside of the plate A. Or the part $A^2$ may be made separately from the part A and abut against the same. If desired this extra plate $A^2$ can be pierced with holes corresponding with some or all of the nail holes in the shoe so that the nails will pass also through the holes in this additional plate $A^2$.

In order to adapt my present invention for use with those well-known short horseshoes in which the heel part extends for a very short distance past the last nail holes and which are used with the well-known bar pads which are situated beyond the heel end of the shoe and are fixed to a piece of leather which is shaped to the outline of the shoe and fits between the shoe and hoof, the attachment plate in this case is constructed to attach to the pad in any of the ways above described but is modified so that it can be attached to an india rubber or like bar pad (see Figs. 10 and 11) which extends across the back of the shoe and abuts against the back ends 16 of the same, the attachment plate in this case marked $A^3$ being made with inturned edges or parts 1 to grip the bar pad or be otherwise formed so as to be attached thereto and also made with parts such as 17 to fit on to the top of the shoe and to be there secured by rivets or other suitable means. The top of the shoe is perfectly plain and flat and not made with any recess to receive these attachment parts 17. The pad C may be further secured by end projections 27 of the plate $A^3$ bent down over the ends of the pad.

What I claim as my invention and desire to secure by Letters Patent is:—

1. A hoof pad for horseshoes comprising a rubber pad adapted to set between or against the heel ends of a horseshoe and to receive frog pressure, and a resilient sheet-metal attachment plate adapted to fit onto the flat top of the shoe and onto the top of the pad and formed with downwardly and inwardly projecting flanges which grip the back and front of the pad below the attachment plate.

2. In a hoof pad for horseshoes, the combination of a flexible pad adapted to fit between or against the heel ends of a horseshoe and to receive frog pressure, and a resilient sheet-metal attachment plate provided with a portion adapted to fit on the top of the shoe and cover the entire shoe opening under the hoof, gripping members formed integrally with said plate for holding said pad, said plate having its end portions projecting at the side of the pad about flush with the top of the pad so as to fit and be fixed onto the flat top of the heel part of the shoe.

3. In combination, a horseshoe, a plate secured to said shoe and having the front and rear edges thereof formed at spaced intervals with inturned flanges, and a pad slidably secured between the flanges of said plate.

4. In combination, a horseshoe, a plate secured to said shoe and having the front and rear edges thereof formed at spaced intervals with inturned flanges, certain of said flanges being stamped to provide vertically extending reinforcing ribs, and a pad slidably secured between said flanges.

5. The combination with a horseshoe, of a plate adapted to be secured to said shoe and provided with a pair of parallel guide flanges extending across the shoe, and a flexible pad provided with a pair of longitudinally extending grooves forming portions adapted to slidably engage said flanges and be retained thereby.

In testimony whereof I affix my signature in presence of two witnesses.

BERTRAM PARROTT GRAY.

Witnesses:
CHARLES BOSWORTH KETLEY,
BERTHA MATILDA DEELEY.

Copies of this patent may be obtained for five cents each, by addressing the "Commissioner of Patents, Washington, D. C."